United States Patent [19]

Beacon

[11] 4,428,622

[45] Jan. 31, 1984

[54] RAILWAY VEHICLE BRAKE SYSTEM WITH FOUR-WAY VALVE

[75] Inventor: Robert G. Beacon, Sparta, N.J.

[73] Assignee: Ellcon-National, Inc., Totowa, N.J.

[21] Appl. No.: 296,140

[22] Filed: Aug. 25, 1981

[51] Int. Cl.³ .............................................. B60T 17/04
[52] U.S. Cl. .................................. 303/84 R; 251/174; 303/86; 137/625.47
[58] Field of Search ...................... 137/625.47, 625.22, 137/625.41; 251/297, 174, 214; 303/81, 86, 56, 303/34, 13, 18, 50, 53, 52, 66, 84, 69, 89; 277/81 R

[56] References Cited

U.S. PATENT DOCUMENTS

| | | | |
|---|---|---|---|
| 2,698,731 | 1/1955 | Koehler et al. | 137/625.47 X |
| 3,037,738 | 6/1962 | Jackson et al. | 251/174 X |
| 3,132,837 | 5/1964 | Britton | 251/174 X |
| 3,154,094 | 10/1964 | Bredtschneider et al. | 251/174 X |
| 3,272,473 | 9/1966 | Veit et al. | 251/174 |
| 3,827,671 | 8/1974 | Bolden et al. | 251/297 X |
| 4,153,305 | 5/1979 | Kennedy et al. | 303/81 |
| 4,232,709 | 11/1980 | Zoric | 137/625.47 |
| 4,262,691 | 4/1981 | Kacal | 251/174 X |

FOREIGN PATENT DOCUMENTS 1209382 10/1962 Fed. Rep. of Germany ....................... 137/625.47

Primary Examiner—Douglas C. Butler
Attorney, Agent, or Firm—Brooks, Haidt, Haffner & Delahunty

[57] ABSTRACT

A railroad vehicle brake system in which a four-way valve is used to control air flow in brake pipe sections and to the control valve which controls the air supplied to a brake cylinder. The four-way valve includes a housing and a rotatable operating member in the form of a truncated bolt with air channels therein which member can be rotated so as to selectively interconnect or cut-off the brake pipe sections and the control valve. The member has operating shafts integral with the bolt which extend from opposite sides of the housing. Multi-part seals are disposed in openings in the housing to which the brake pipe sections and the control valve are connected and have portions urged into contact with the bolt.

13 Claims, 11 Drawing Figures

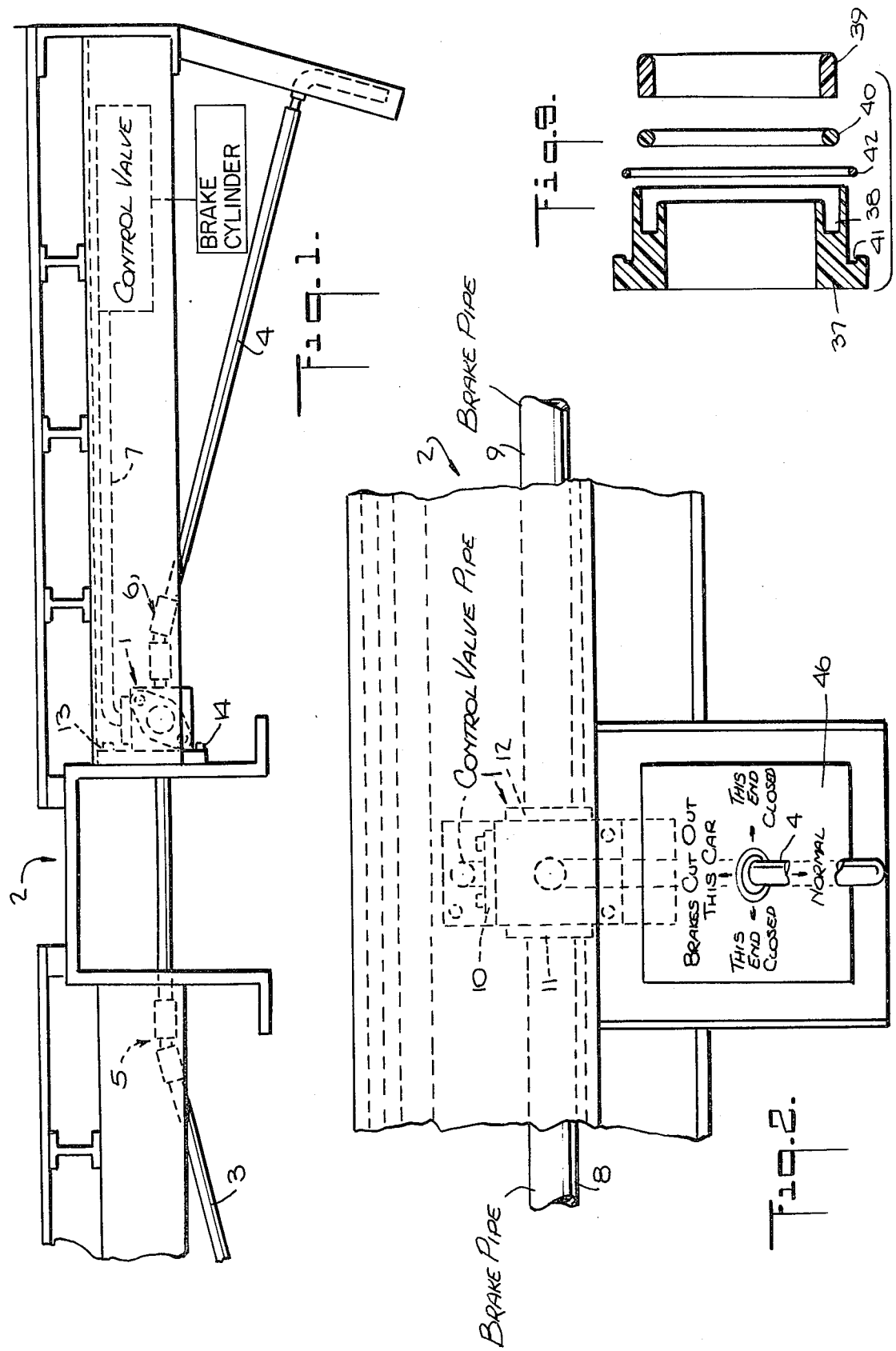

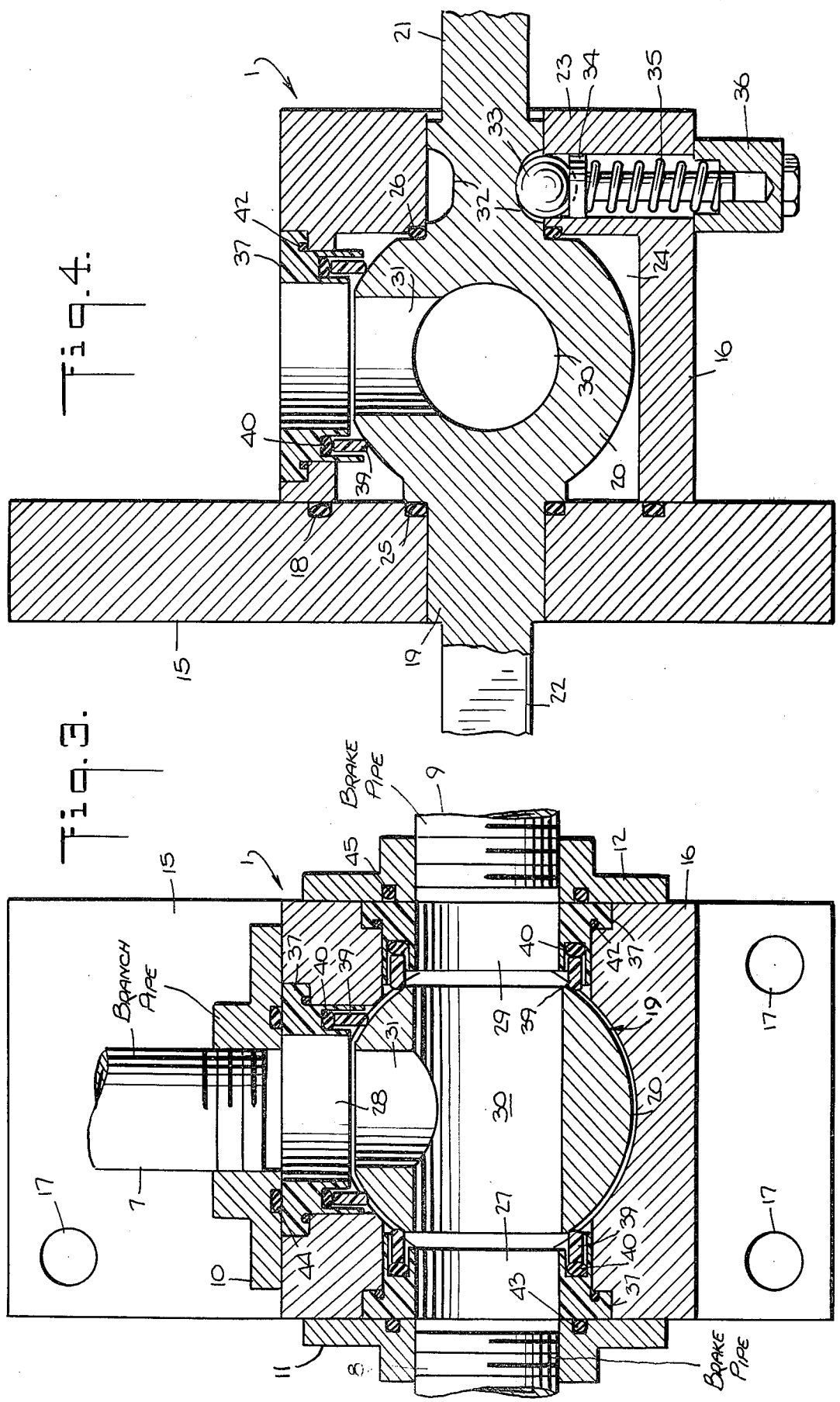

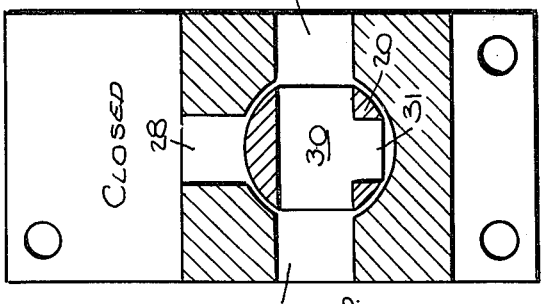
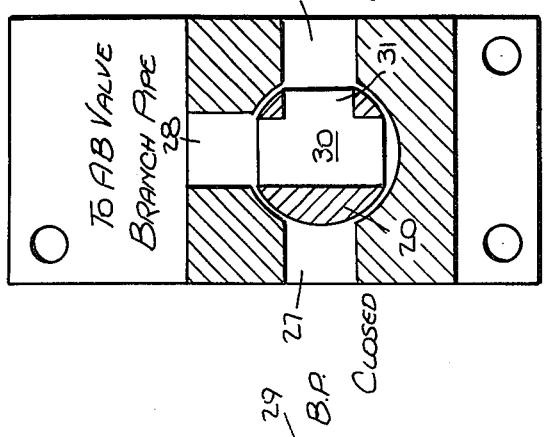
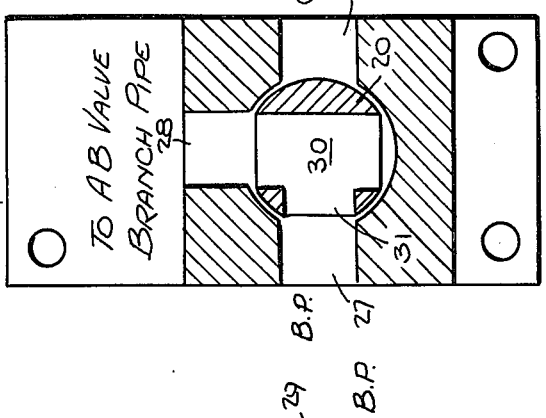
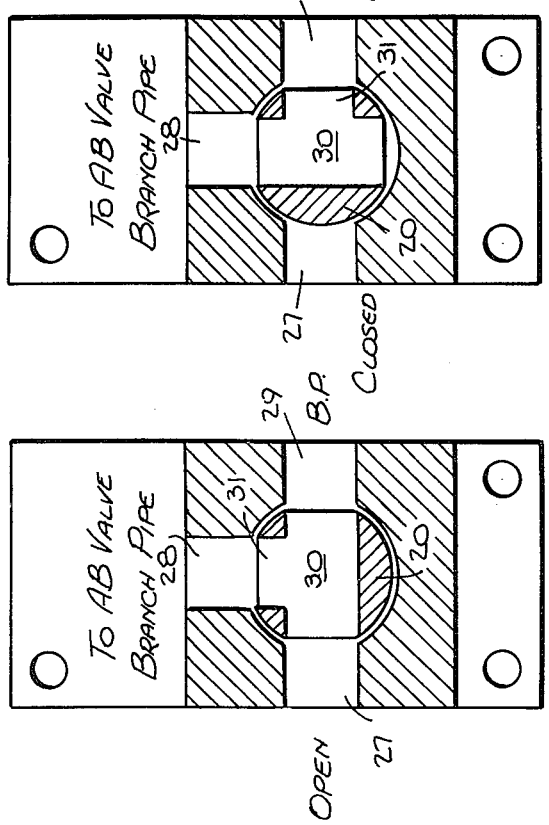
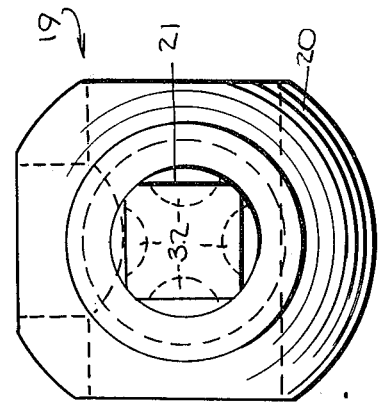
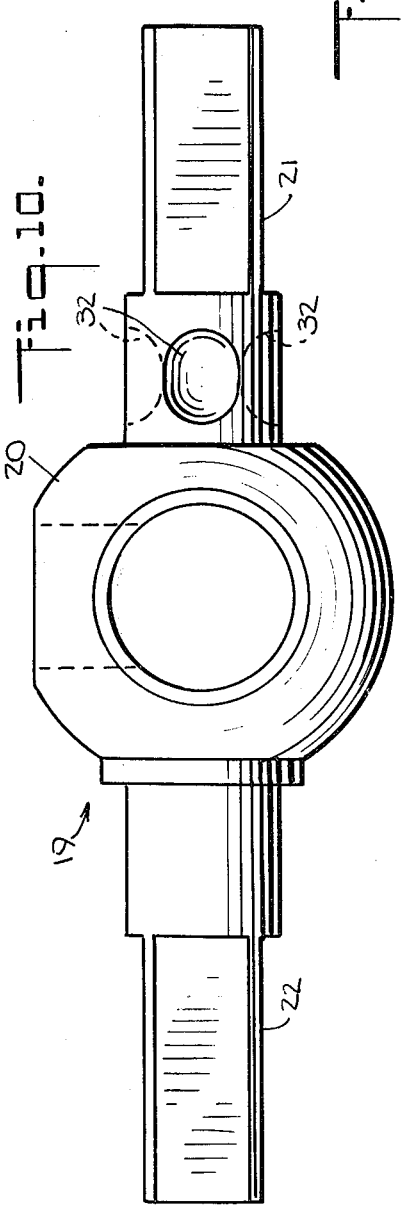

RAILWAY VEHICLE BRAKE SYSTEM WITH FOUR-WAY VALVE

This invention relates to valves used in the brake systems of railroad vehicles.

The standard air brake system used on freight cars in North America includes a brake pipe which extends from one end of a car to the other end thereof. Each end of the pipe is connected to a manually operable shut-off valve, known as an angle cock, which in turn is connected to a flexible hose used for interconnecting the brake pipe to the flexible hose of the next car.

An an intermediate point on the brake pipe, there is a tee which connects the brake pipe through further piping and a manually operable, shut-off valve to the control valve for the brake cylinder or cylinders of the car. Thus, there are three manually operable valves on the car which may be operated to provide various air interconnections or air cut-off on a car.

It has been proposed to substitute a single, manually operable, four-way valve for the three manually operable valves. See, for example, U.S. Pat. Nos. 4,153,305 and 4,232,709.

The four-way valves heretofore available have not been entirely satisfactory for use in railroad vehicles not only because they have been expensive but also because of seal leakage and difficulties with the operating mechanisms. The valves usually must be operable from both sides of a car, and the seals must withstand rather severe operating conditions without leakage.

One object of the invention is to provide a four-way valve for use in the brake systems of railroad vehicles which is relatively inexpensive as compared to prior art four-way valves, which has seals which can withstand the operating conditions for a long period of time without leakage and which can be operated from either side of the vehicle.

In accordance with the preferred embodiment of the invention, the operating member of the valve is mounted in a housing having three openings to which the valve branch pipe and sections of the brake pipe are connected. The valve operating member is one-piece and has a central portion conforming, at least in part, to the shape of a ball. The operating member also comprises a pair of operating shafts integral with and extending in opposite directions from the central portion. The operating shafts extend outwardly from opposite sides of the housing. Preferably, one of the shafts has recesses therein which co-operate with a spring pressed, ball detent on the housing to maintain the operating member in the position to which it is set manually.

Each of the openings in the housing has a multi-part sealing member therein which, at its inner end, engages the central portion of the operating member so as to provide an effective air seal between the housing and the operating member. Preferably, the sealing member is a flanged, hollow cylinder of a plastic material, such as nylon, which has an inner end recess for slidably receiving a first ring of a plastic material, such as ultra high molecular weight polyethylene, with a second ring of elastic material, such as neoprene, intermediate the first ring and the cylinder to urge the first ring into engagement with the central portion of the operating member.

Other objects and advantages of the present invention will be apparent from the following detailed description of the presently preferred embodiments thereof, which description should be considered in conjunction with the accompanying drawings in which:

FIG. 1 is a fragmentary, end elevational view illustrating the mounting of the valve of the invention on a railroad vehicle;

FIG. 2 is a fragmentary side elevational view of the apparatus shown in FIG. 1;

FIGS. 3 and 4 are, respectively, end elevation and side elevation, cross-sectional views of the valve of the invention, the branch pipe and its flange being omitted in FIG. 4;

FIGS. 5-8 are schematic drawings illustrating the operating of the valve of the invention;

FIG. 9 is an exploded, cross-sectional view of the sealing means employed in the valve of the invention; and FIGS. 10 and 11 are, respectively, side elevation and end elevation views of the operating member of the valve of the invention.

FIG. 1 illustrates the valve 1 of the invention mounted on the frame 2 of a railroad vehicle. Th valve 1 may be secured to the frame 2, such as by means of bolts 13 and 14. The operating shafts, described hereinafter, of the valve 1, are connected to extension handles 3 and 4 by means of universal joints 5 and 6. One opening in the housing of the valve 1 is connected by means of a branch pipe 7 to the control valve (not shown) which controls the supply of fluid, such as air, to the brake cylinder or cylinders of the vehicle.

With reference to FIG. 2, the valve 1 has a pair of openings which are connected to the brake pipe sections 8 and 9. The brake pipes 8 and 9 and the branch pipe 7 may be connected to the valve 1 by conventional pipe flanges 10, 11 and 12 which may be secured to the body of the valve 1 in any conventional manner, such as by bolts extending into threaded holes in the body.

With reference to FIGS. 3 and 4, the valve 1 comprises a body or housing which includes a plate 15 secured to a box-like enclosure 16 in any conventional manner, such as by bolts (not shown) extending into threaded holes in the enclosure 16. The plate 15 may be provided with holes 17 for the passage of the mounting bolts 13, 14, etc. (FIG. 1). The plate 15 and the enclosure 16 are connected in fluid-tight relation by means of an O-ring 18 which may, for example, be made of neoprene.

The valve operating member 19 (FIGS. 3, 4, 10 and 11), preferably made of a corrosion resistant metal, such as a high strength manganese-bronze alloy, comprises a central portion 20 in the shape of a truncated, spherical ball. A pair of operating shafts 21 and 22 are integral with the central portion 20 and extend in opposite directions from the central portion 20. The shafts 21 and 22 also extend outwardly of the housing, the shaft 22 being rotatably received in an opening in the plate 15 and the shaft 21 being rotatably received in an opening in a wall 23 of the enclosure 16. Preferably, the outermost portions of the shafts 21 and 22 are non-circular, e.g. square, in a cross-section taken perpendicularly to the axis thereof for receiving portions of the universal joints 5 and 6 (FIG. 1) which have bores of corresponding shape.

The central portion 20 of the operating member 19 is received within the cavity 24 of the housing and at its end adjacent the housing walls, fluid-tight seals are formed by O-rings 25 and 26 made, for example, of neoprene.

The housing has three openings, 27, 28 and 29 in fluid communication, respectively, with the brake pipe section 8, the branch pipe 7 and the brake pipe section 9. The central portion 20 has a through-channel 30 which, in FIGS. 3 and 4, is aligned with the co-axial openings 27 and 29. The central portion 20 also has a second channel 31 which extends from the exterior of the central portion 20 to the through channel 30. With rotation of the operating member 19, the outer ends of the channels 30 and 31 can be moved to positions adjacent the openings 27–29.

FIGS. 5–8 illustrate schematically how the central portion 20 interconnects the various openings 27–29 with rotation of the operating member 19. FIG. 5 illustrates the normal position of the operating member 19 which is also illustrated in FIGS. 3 and 4. In this position, which would be the normal position for an intermediate vehicle in a train of vehicles, the sections 8 and 9 of the brake pipe would be in fluid communication with each other and with the branch pipe 7. Assume that the vehicle is an end vehicle and its rear is at the left as viewed in FIG. 6. The brake pipe section 8 may be closed off by rotating the operating member 19 clockwise through 90° as shown in FIG. 6. In this position, the brake pipe section 9 and the branch pipe 7 are in fluid communication with each other.

Similarly, if the vehicle is an end car with its rear at the right as viewed in FIG. 7, the brake pipe section 9 may be cut-off, leaving the section 8 in fluid communication with the branch pipe 7, by rotating the operating member 19 counter-clockwise through 90° to the position shown in FIG. 7.

If it is desired to cut-out the brakes of an intermediate car while leaving the sections 8 and 9 of the brake pipe in fluid communication with each other, the operating member 19 is rotated through 180° to the position shown in FIG. 8.

The operating member 19 may be restrained with respect to unintentional movement out of one of its four positions by a detent mechanism of the type illustrated in FIG. 4. The shaft 27 has four hemispherical recesses 32 equally spaced circumferentially of the shaft 21 and in positions which will hold the shaft 21 against unintentional movement from the positions of the operating member 19 illustrated in FIGS. 5–8 when a metal ball 33 is received in the appropriate recess 32. The ball 33 is urged toward the shaft 21 by a pusher 34, which may be made of a plastic material, such as nylon, and which is engaged by a compression spring 35. The spring 35 is compressed by a cap 36 secured to the enclosure 16 by conventional means such as bolts, one bolt being visible in FIG. 4.

An important aspect of the invention is the sealing means used to provide a seal between the central portion 20 and the peripheries of the openings 27–29. The seals must be long-lasting under the conditions of use, and a one-piece sealing means for all openings and separate sealing means which are not urged toward the central portion 20 have been found to be not satisfactory. Furthermore, for manufacturing and repair purposes, it is desirable that each of the three required sealing means be the same.

In accordance with the preferred embodiment of the invention, each of the sealing means has the structure shown in FIG. 9 and comprises a flanged, hollow cylinder 37 with a recess 38 for slidably receiving a ring 39 with a second resilient ring 40 intermediate the ring 39 and the bottom of the recess 38. The cylinder 37 also has a groove 41 for receiving an O-ring 42 for sealing the cylinder 37 to the enclosure 16.

While other materials may be used, preferably, the cylinder 37 is made of nylon, the ring 39 is made of ultra high molecular weight polyethylene and the ring 40 is made of neoprene of about 60–70 durometer. The outer dimensions of the cylinder 37 are such that it has a push fit in a wall opening of the enclosure 16. The cylinders 37 are held in place and the rings 40 are compressed by the respective flanges 10, 11 and 12, the axial dimensions of the cylinder 37 and the rings 39 and 40 being such that the rings 40 are compressed when the inner face on the flange of the cylinder 37 abuts the enclosure 16, sealing rings 43–35 (FIG. 3) provide fluid-tight seals between the flanges 10–12 and the enclosure 16.

It will be observed that the rings 39 ride on the spherical portions of the central portion 20 and are in contact with such portions at all times. The compressed rings 40 urge the rings 39 toward the central portion 20 and accommodate eccentricity and longitudinal and transverse movement of the central portion 20.

It will also be observed that the sealing means comprising the rings 39 etc. are sufficient in themselves to prevent fluid leakage within the enclosure 16, but for precautionary reasons, the cavity 24 is also sealed by the sealing rings 18, 25, 26 and 42 so that in the event that there is any fluid leakage into the cavity 16, the fluid does not leak outside the housing. In addition, fluid pressure build-up in the cavity 24 will retard or prevent further leakage past the rings 39. Also, the additional sealing rings 18, 25, 26 and 42 prevent the ingress of moisture, dirt, etc. into the cavity 24.

It will be apparent from the drawings and the foregoing that the operating member 19 of the valve 1 may be rotated from either side of a vehicle by operating the appropriate handle 3 or 4 which extends to the side of the vehicle. Also, with the detent system used, it is merely necessary to rotate a handle 3 or 4 to rotate the operating member 19, and it is not necessary to operate any special latching mechanism before rotating a handle. Of course, when one handle is rotated, the other handle rotates a corresponding amount so that the position of the operating member 19 is indicated by the indicator plates on each side of the vehicle, such as the indicator plate 46 shown in FIG. 2.

Although preferred embodiments of the present invention have been described and illustrated, it will be apparent to those skilled in the art that various modifications may be made without departing from the principles of the invention.

I claim:

1. In a brake system for a railroad vehicle having a brake cylinder, a fluid operable control valve for controlling the fluid supplied to said cylinder, said valve having a controlling fluid input opening, and a brake pipe having two sections, a manually operable valve connected to said opening in said control valve and to said sections of said brake pipe for alternatively connecting, for fluid flow therebetween, said sections and said opening, one of said sections and said opening, the other of said sections and said opening and said sections only, said manually operable valve comprising:

a housing having three openings extending from the interior of said housing to the exterior thereof, two of said openings being co-axial and the third of said openings having its axis extending perpendicularly to the axis of said two openings;

means connecting each of said two openings respectively to a section of said brake pipe;

means connecting said third opening to said opening in said control valve;

a valve operating member rotatably mounted in said housing, said member having a central portion having a first channel extending therethrough, said member being rotatable into a position in which said first channel is aligned with said two openings and into other positions in which said first channel has one end at said third opening and said central portion also having a second channel therein extending from the exterior of said central portion to said first channel, said member being rotatable into positions in which said second channel has one end at one of said three openings in said housing, said member also having a pair of operating shafts integral with said central portion and respectively extending in opposite directions from said central portion and outwardly of said housing; and sealing means in each of said three openings for providing a fluid seal between said housing and said central portion of said valve operating member, each of said sealing means comprising a hollow cylinder mounted in the corresponding opening with the axis thereof aligned with the opening, said hollow cylinder having a portion thereof forming at least one wall of an annular channel between said cylinder and the wall of the corresponding opening and said channel opening toward said central portion of said valve operating member, a sealing ring slidably mounted in said channel and engaging said central portion and a resilient, compressed ring mounted in said channel between said sealing ring and said hollow cylinder and acting between said hollow cylinder and said sealing ring to urge the latter against said central portion of said valve operating member and thereby provide a seal around the end of the channel in said central portion adjacent to the hollow cylinder.

2. A brake system as set forth in claim 1 wherein said sealing ring is made of a plastic material and said resilient, compressed ring is a ring of an elastic material which is more compressible than said sealing ring of a plastic material.

3. A brake system as set forth in claim 1 wherein one of said operating shafts has four recesses therein spaced circumferentially of said one shaft and further comprising detent means on said housing and receivable in said recesses for resisting rotation of said operating member from positions in which said first channel and said second channel interconnect said openings.

4. A brake system as set forth in claim 1 wherein said central portion has the shape of a truncated, spherical ball and wherein said sealing means engages spherical portions of said ball.

5. A brake system as set forth in claim 1 wherein each of said operating shafts is non-circular in a cross-section taken perpendicular to the axis thereof.

6. A four-way valve comprising:

a housing having three openings extending from the interior of said housing to the exterior thereof, two of said openings being co-axial and the third of said openings having its axis extending perpendicularly to the axis of said two openings;

a valve operating member rotatably mounted in said housing, said member having a central portion having a first channel extending therethrough, said member being rotatable into a position in which said first channel is aligned with said two openings and into other positions in which said first channel has one end at said third opening and said central portion also having a second channel therein extending from the exterior of said central portion to said first channel, said member being rotatable into positions in which said second channel has one end at one of said three openings in said housing, said member also having a pair of operating shafts integral with said central portion and respectively extending in opposite directions from said central portion and outwardly of said housing; and sealing means in each of said three openings for providing a fluid seal between said housing and said central portion of said valve operating member, each of said sealing means comprising a hollow cylinder mounted in the corresponding opening with the axis thereof aligned with the opening, said hollow, cylinder having a portion thereof forming at least one wall of an annular channel between said cylinder and the wall of the corresponding opening and said channel opening toward said central portion of said valve operating member, a sealing ring slidably mounted in said channel and engaging said central portion and a resilient, compressed ring mounted in said channel between said sealing ring and said hollow cylinder and acting between said hollow cylinder and said sealing ring to urge the latter against said central portion of said valve operating member and thereby provide a seal around the end of the channel in said central portion adjacent to the hollow cylinder.

7. A valve as set forth in claim 6 wherein said sealing ring is made of a plastic material and said resilient, compressed ring is a ring of an elastic material which is more compressible than said sealing ring of a plastic material.

8. A valve as set forth in claim 6 wherein one of said operating shafts has four recesses therein spaced circumferentially of said one shaft and further comprising detent means on said housing and receivable in said recesses for resisting rotation of said operating member from positions in which said first channel and said second channel interconnect said openings.

9. A valve as set forth in claim 6 wherein said central portion has the shape of a truncated, spherical ball and wherein said sealing means engages spherical portions of said ball.

10. A valve as set forth in claim 6 wherein each of said operating shafts is non-circular in a cross-section taken perpendicular to the axis thereof.

11. A four-way valve comprising:

a housing having three openings extending from the interior of said housing to the exterior thereof, two of said openings being co-axial and the third of said openings having its axis extending perpendicularly to the axis of said two openings;

a valve operating member rotatably mounted in said housing, said member having a central portion having a first channel extending therethrough, said member being rotatable into a position in which said first channel is aligned with said two openings and into other positions in which said first channel has one end at said third opening and said central portion also having a second channel therein extending from the exterior of said central portion to said first channel, said member being rotatable into positions in which said second channel has one end at one of said three openings in said housing; and sealing means in each of said three openings for providing a fluid seal between said housing and said central portion of said valve operating member, each of said sealing means comprises a hollow cylinder with an annular channel at the end thereof nearer said central portion and opening toward said central portion, a sealing ring mounted in the last-mentioned channel and slidable axially of said cylinder, said ring slidably engaging said central portion, and a resilient, compressed ring mounted in the last-mentioned said channel and urging said sealing ring toward said central portion.

12. A valve as set forth in claim 11 wherein said sealing ring is made of a plastic material and said resilient, compressed ring is more compressible than said sealing ring of a plastic material.

13. A valve as set forth in claim 11 wherein said central portion has the shape of a truncated, spherical ball and wherein said sealing ring engages spherical portions of said ball.

* * * * *